United States Patent Office 3,093,490
Patented June 11, 1963

3,093,490
CERAMIC METALIZING MIXTURE AND
METHOD OF COMPOUNDING IT
Robert John Mackey, San Carlos, Calif., assignor to Eitel-McCullough, Inc., San Carlos, Calif., a corporation of California
No Drawing. Filed Apr. 8, 1960, Ser. No. 20,800
6 Claims. (Cl. 106—1)

This invention relates to a mixture for use in metalizing ceramics, and particularly to a fluid mixture and method of compounding such a mixture which can be applied by brush, roller, sprayer, or stencil on a ceramic surface.

Vacuum tubes having ceramic envelope walls are now accepted by the vacuum tube industry as being superior to vacuum tubes having glass envelopes. One reason why ceramics have not been used to a greater extent to replace the glass in tube envelopes is that the mixture used for metalizing the ceramics was difficult to handle. If the mixture was a paint, it was unstable in that the elements separated or settled, and dry mixtures had their own inherent disadvantages.

In Patent 2,667,427, H. J. Nolte teaches a method for metalizing a surface on a ceramic member. Nolte applies a mixture of powders consisting of manganese and molybdenum on the ceramic and sinters the powder onto the ceramic. In a copending application, Serial No. 537,719, filed September 30, 1955, and assigned to the same assignee as this application, Welch et al. teaches a method of improving the metalizing on a ceramic body by applying a mixture of powders which include the above two metals, manganese and molybdenum, plus a small amount of titanium either in the metal, oxide, or hydride form. The purpose of the titanium is to produce a metalized surface which has a tighter affinity for the ceramic than the metalized surface as taught in Nolte.

From the teachings of the above patent, the electron tube industry has been trying to produce a successful paint which includes these metals, will not separate or settle when stored, and can be easily applied to a ceramic member by such processes as brushing, rolling, stenciling, or spraying.

In the past, a metalizing paint mixture was made using the oxides of the above metals. Because the oxides are less dense than the powdered metals, they can be suspended or flocculated in a fluid medium more readily and for longer periods than can the denser powdered metals. Ceramics metalized with the oxide paints are observed to have hairline cracks in the metalized surface indicating that the metalized surface shrinks during processing. The ceramics are metalized a second time in order to eliminate the hairline cracks. The metalized area also spreads or "blushes" and thus covers a larger area of the ceramic than the area on which the paint was applied. These features are objectionable in the electron tube art because tubes with closely spaced terminals will short, arc over, and develop leaks. The unwanted metalized blush-surface can be removed by treating the area with a solution of hydrofluoric and nitric acids, but this process is costly as well as being dangerous to the technician and detrimental to the ceramic.

It is an object of this invention to produce a metalizing paint for ceramics which flocculates the elemental metallic particles in the paint.

It is another object of this invention to provide a suitable metalizing paint for ceramics incorporating powdered metallic elements.

It is still another object of this invention to provide a suitable metalizing paint compound for ceramics which does not flow during sintering and "blush" the ceramic.

It is yet another object of this invention to provide a "non-shrinking" metalizing paint for ceramics.

A still further object of the invention is to provide a method by which such a non-settling metalizing paint may be compounded.

In terms of broad inclusions, the paint contains manganese, in either the elemental metallic form or in a chemical compound, powdered metallic molybdenum, and a powdered metal chosen from the group consisting of titanium, tantalum, and columbium. The metals from this group may be in a metallic, oxide, or hydride form. The paint must contain powdered elemental metallic molybdenum so that the paint has the characteristic of producing non-blushing and non-shrinking metalized surface, and therefore, a suitable flocculating medium which can flocculate the dense molybdenum was added to the paint. The paint also includes suitable resins and thinner which makes the paint wettable and fluid.

In order that those skilled in the art may better understand how the present invention may be carried into effect, the following illustrative examples thereof are given:

*Example I*

1200 grams of molybdenum powder
200 grams of manganese powder
200 grams of manganese stearate
100 grams of titanium oxide The above was added to a gallon ball mill containing:

720 milliliters (Socal No. 2) low aniline type petroleum solvent
250 milliliters (Reichold (458A) synthetic resin solution which contains:
 50% synthetic resin, a modified maleic acid resin having a low ash content and
 50% thinner (Socal No. 2)

After the above mixture was ground for 24 hours in the ball mill and the fineness of the grind (Hegman gauge) indicated a reading 6.5 to 7.0, 1000 milliliters of ethyl cellulose lacquer were added to the mill and mixed for 4 hours. The paint was removed from the mill and stored. A usable paint was found to have a Saybolt viscosity of 100 seconds and a weight per gallon of 13.1 pounds. After the paint has been milled as thus described, additional ethyl cellulose lacquer may be added in order to reduce the viscosity as needed to facilitate application of the paint by the various methods such as by roller, brush, or spray.

This paint was applied in the usual manner on an alumina ceramic member. The painted member was sintered in a furnace, producing a metalized surface which did not blush and have hairline shrink-cracks.

*Example II*

960 grams of molybdenum powder
160 grams of manganese powder
120 grams of manganese stearate
358 grams of molybdenum trioxide
94 grams of manganese dioxide
100 grams of titanium oxide The above was added to a gallon ball mill containing approximately the same quantities of solvent and resin as shown in Example I, and this mixture was also ground until the solids were of small size. This paint produced a metalized surface having the same qualities as the paint of Example I.

*Example III*

600 grams of molybdenum powder
100 grams of manganese powder
100 grams of manganese stearate
895 grams of molybdenum trioxide
235 grams of manganese dioxide
100 grams of titanium dioxide The above was added to a gallon ball mill containing approximately the same quantities of solvent and resin as shown in Example I, and this mixture was also ground until the solids were of small size. The 895 grams of molybdenum trioxide consisted of 600 grams of molybdenum and 295 grams of oxygen. Thus, this paint has one-half of its molybdenum content in metallic form and one-half in the oxide form. A usable metalized surface was produced but its quality was not so good as the metalized surface produced by the paint of Example II, indicating that if the percentage of molybdenum in oxide form to molybdenum in metallic form is increased to over 50% in the paint mixture, the metalized surface produced has excessive shrinkage and will "blush."

*Example IV*

1200 grams of molybdenum powder
300 grams of manganese powder
100 grams of stearic acid
100 grams of titanium oxide The above was added to a gallon ball mill containing approximately the same quantities of solvent and resin as shown in Example I, and this mixture was also ground until the solids were of small size. This paint produced a metalized surface which had substantially the same characteristics as the paint in Example I. This example illustrates that stearic acid can be used to flocculate the heavy metal particles.

*Example V*

300 grams of molybdenum powder
120 grams of manganese dioxide
25 grams of titanium oxide
25 grams of corn starch The above was added to a ball mill containing suitable quantities of the same solvent and resin as used in Example I. This paint was actually the first of the examples to be tried, and was the first successful paint mixture containing a dense metallic powder which did not separate and proved that heavy metal particles can be flocculated in a liquid medium. A ceramic member metalized with this paint had specks of carbon deposited in the metalizing, but the metalizing did not blush. The carbon was an ash from corn starch. Both stearic acid and manganese stearate did not produce an ash and are preferred to corn starch as the flocculating agent.

*Example VI*

300 grams of molybdenum
100 grams of manganese
50 grams of titanium hydride
30 grams of Methocal Suitable solvent and resin were added to the mixture and then it was ball milled. This paint was successful in flocculating the dense metal powders, but the Methocal absorbed too much solvent.

Examples V and VI were the first paints produced by which a non-shrinking and non-blushing metalized surface on a ceramic member was successfully produced. These paints indicated that a paint containing the metallic form of molybdenum can be made so that the molybdenum will stay in suspension and not settle to the bottom. The next problem to be solved was to find a suitable substitute for the corn starch and Methocal. Stearic acid was found to be a good substitute, but manganese stearate a much better substitute for the corn starch, since a good metalizing mixture requires manganese, and manganese stearate adds manganese and still keeps the amount of unnecessary elements to a minimum.

The inventor teaches a method of making a paint for metalizing ceramics so that the metalized surface does not blush or shrink but produces a clear, sharp, even metalized surface on the ceramics.

I claim:

1. A ceramic metalizing paint consisting esssentially of a mixture of at least two members of the group consisting of molybdenum, molybdenum trioxide, manganese, manganese dioxide and manganese trioxide, said mixture containing both molybdenum and manganese with at least 50% of the total molybdenum in said mixture being in elemental metallic from, a vehicle, a resinous binder and a flocculating agent to maintain said mixture suspended, thereby obtaining a uniform paint.

2. The ceramic metalizing paint of claim 1 wherein the flocculating agent is manganese stearate.

3. The ceramic metalizing paint of claim 1 wherein the flocculating agent is stearic acid.

4. The ceramic metalizing paint of claim 1 wherein the flocculating agent is cornstarch.

5. The ceramic metalizing paint of claim 1 which contains minor amounts of a member of the group consisting of titanium, titanium oxide, titanium dioxide and titanium hydride.

6. The ceramic metalizing paint of claim 1 wherein the proportion of molybdenum to manganese ranges from about 3–1 to about 6–1 by weight.

References Cited in the file of this patent

UNITED STATES PATENTS

| | | |
|---|---|---|
| 2,667,427 | Nolte | Jan. 26, 1954 |
| 2,807,553 | Fischer | Sept. 24, 1957 |
| 2,814,571 | Iverson | Nov. 26, 1957 |
| 2,928,755 | Brandstadt | Mar. 15, 1960 |